United States Patent [19]

Strybel

[11] 4,017,057
[45] Apr. 12, 1977

[54] ADJUSTABLE VALVE CORE DEPRESSOR

[75] Inventor: Richard V. Strybel, Elk Grove Village, Ill.

[73] Assignee: Imperial-Eastman Corporation, Chicago, Ill.

[22] Filed: Apr. 28, 1976

[21] Appl. No.: 681,136

[52] U.S. Cl. .................. 251/149.1; 251/149.4; 251/149.6

[51] Int. Cl.² ....................... F16L 37/28

[58] Field of Search ......... 251/149.1, 149.4, 149.5, 251/149.6, 149.7, 149.8; 137/322, 231, 223

[56] References Cited

UNITED STATES PATENTS

| 1,740,015 | 12/1929 | Hooper et al. | 251/149.6 |
| 2,322,462 | 6/1943 | Marquardt et al. | 251/149.5 |
| 2,434,167 | 1/1948 | Knoblauch | 251/149.6 |
| 2,757,684 | 8/1956 | Ulrich | 251/149.7 X |
| 2,881,011 | 4/1959 | Coughlin | 251/149.4 X |
| 3,592,439 | 7/1971 | Ritchie, Jr. | 251/149.6 |

Primary Examiner—William R. Cline
Attorney, Agent, or Firm—Wegner, Stellman, McCord, Wiles & Wood

[57] ABSTRACT

A fluid coupling having an improved adjustable valve core depressor for effecting the opening of a normally closed valve in a connector portion of the coupling as a result of the connection of the connector portion to a body portion of the coupling in making up the fitting. The depressor is threadedly mounted to the coupling body and is provided with a locking portion adjustably retaining the depressor in adjusted position for improved controlled depressing of the connector valve in the make-up of the fitting.

14 Claims, 4 Drawing Figures

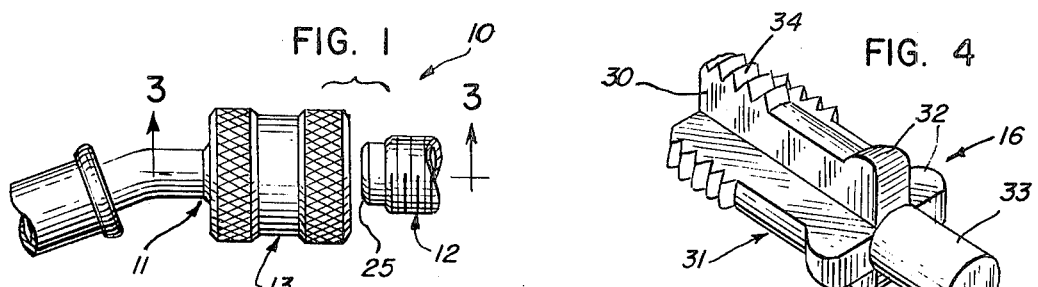
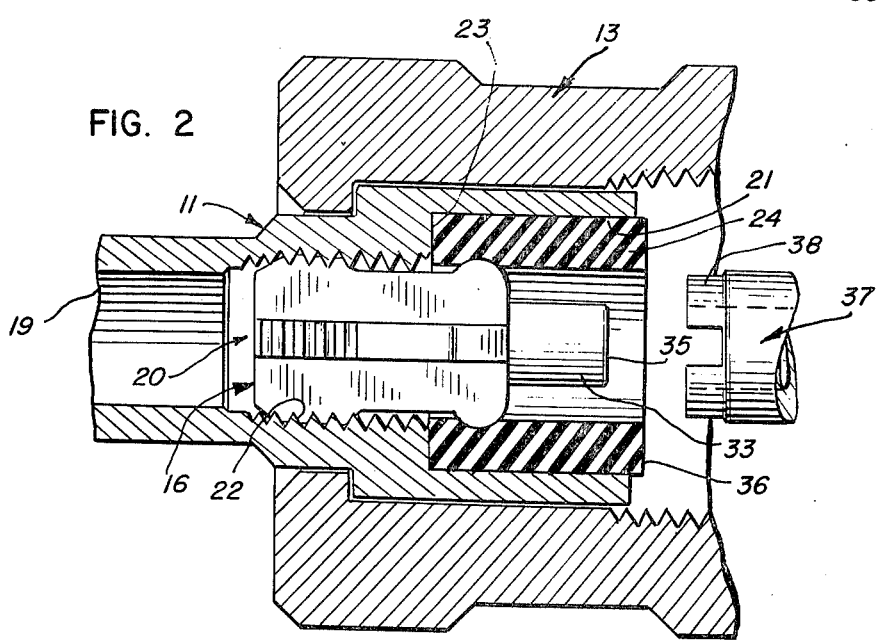
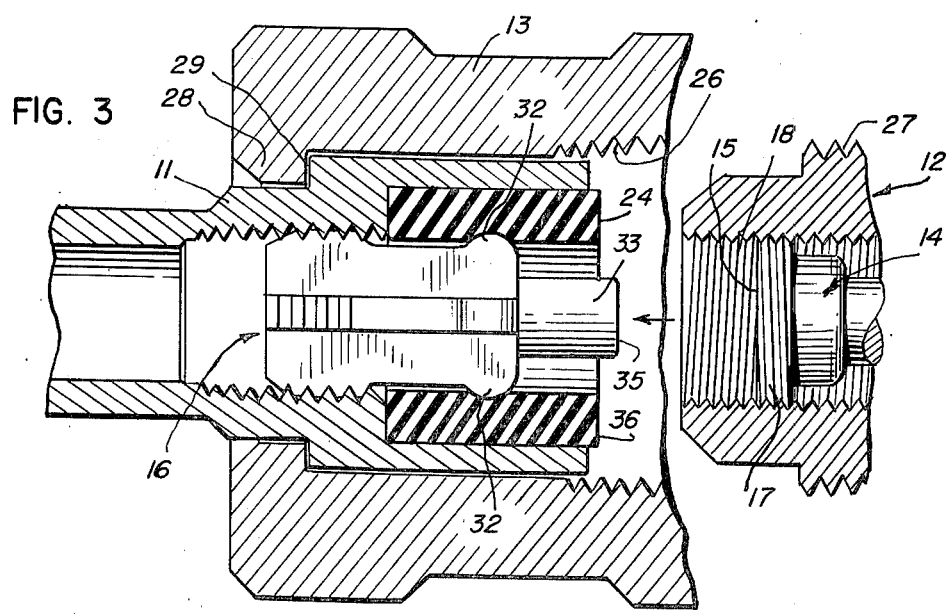

ADJUSTABLE VALVE CORE DEPRESSOR

BACKGROUND OF THE INVENTION

1. Field of the Invention

This invention relates to fluid couplings and in particular to fluid couplings utilizing adjustable depressor means for automatically opening a normally closed valve of a connector of the coupling as an incident of make-up of the fitting.

2. Description of the Prior Art

In U.S. Pat. No. 2,322,462, of Ronald E. Marquardt et al., a check valve is provided in a coupling such as for use in controlling delivery of air to associated tools, machines, apparatus, and the like. As shown therein, a connector adapted for connection to a hose end carrying fluid under pressure is provided with a ball check valve at its distal end normally closing the connector so as to prevent escape of air from the hose when the connector is disconnected from a body portion of the coupling. The body portion includes a stud which is axially positionably mounted to the body portion and locked in the desired adjusted position by a nut engaging a threaded portion of the stem and one end of the body.

When the connector is connected to the body, the stud engages the ball of the check valve in the connector to space the ball from the valve seat defined by the distal end of the connector and thereby provide fluid communication between the connector and coupling body for delivery of air under pressure through the coupling as desired.

In U.S. Pat. No. 2,881,011, of William B. Coughlin, a valve installation and attachment is shown wherein a core-type valve is mounted in a coupling body to normally close the flow passage therethrough. An attachment member may be connected to the body with sealing means being provided for sealing the attachment to the body prior to an opening of the core valve by engagement of a portion of the attachment therewith as a result of the connection of the attachment to the body.

Another form of automatic check valve opener structure in a fluid like coupling is shown in U.S. Pat. No. 3,592,439 of John R. Ritchie, Jr. As shown therein, a valve core depressor is provided with a base portion having a spiral buttress thread threaded into a resilient gasket for holding the core depressor in position in the coupling. The threaded portion of the depressor is required to be of smaller axial dimension than the gasket to provide the desired axial adjustment of the core depressor. A wrench is employed to twist the core depressor in the resilient gasket to effect desired selective positioning thereof. The sole support of the core depressor is its resilient mounting within the gasket.

SUMMARY OF THE INVENTION

The present invention comprehends an improved fluid coupling having an improved valve depressor means which may be accurately coaxially positioned within the coupling body and releasably secured in the adjusted position for proper operation of the connector valve when the connector is connected to the valve body in the make-up of the fitting.

The valve depressor may be threadedly secured to a threaded portion of the valve body for positive coaxial adjustable mounting of the core depressor therein. The threaded portion of the valve depressor may have an axial extent less than that of the threaded portion of the coupling body so as to provide a preselected range of axial positional adjustment of the core depressor as desired.

The core depressor may be releasably secured in the adjusted position by the engagement of a locking portion thereof with suitable frictional retaining means carried by the coupling body. In the illustrated embodiment, the frictional retaining means comprises means further serving as a seal for sealingly connecting the connector to the valve body in the made-up arrangement of the fitting.

More specifically, the locking portion of the valve depressor may comprise a radially outwardly extending surface slidably engaging the inner surface of a tubular seal carried in an outer recess portion of the coupling body bore. In the illustrated embodiment, the locking means comprises a plurality of such surfaces spaced angularly about the axis of the valve depressor and providing a preselected retaining force which, while effectively assuring maintained positioning of the valve depressor in the desired adjusted position, permits facilitated readjustment thereof when desired.

The engagement of the locking portion of the valve depressor with the seal remotely from the threaded portion of the valve depressor further provides effectively maintained axial parallelism of the depressor relative to the axis of the coupling for accurate alignment of the depressor portion with the operating element of the connector valve.

In the illustrated embodiment, the valve depressor is formed of molded synthetic resin and may be positionally adjusted in the coupling body by means of a suitable tool which may also be formed of molded synthetic resin.

Thus, the fluid coupling structure of the present invention is extremely simple and economical of construction while providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary side elevation of a fluid coupling embodying the invention;

FIG. 2 is a fragmentary enlarged diametric section thereof with a portion of an adjusting tool shown in association therewith;

FIG. 3 is a fragmentary enlarged diametric section taken substantially along the line 3—3 of FIG. 1; and FIG. 4 is a perspective view of the valve depressor.

DESCRIPTION OF THE PREFERRED EMBODIMENT

In the exemplary embodiment of the invention as disclosed in the drawing, a fluid coupling generally designated 10 is shown to include a coupling body 11, a connector 12, and an interconnecting nut 13. Connector 12 is provided with a normally closed valve 14 which may comprise a conventional Schroeder-type core valve, or the like. Such valves are well known in the art and the specific construction thereof forms no part of the invention. Such valves conventionally include an operating element, such as operating element 15, which when suitably engaged and depressed, effects an opening of the valve 14 to permit fluid flow therethrough.

The present invention is concerned with the provision of an improved valve operator generally designated 16 carried by the valve body 11 for effecting an automatic depression of the operating element 15 as an incident of the connection of the connector 12 to the body 11 by the connecting nut 13 in the make-up of the coupling. As best seen in FIG. 3, the valve 14 includes a mounting portion 17 received in a threaded inner end 18 of the connector for positioning the operating element 15 at the inner end of the connector for engagement by the valve operator means 16.

As best seen in FIG. 2, coupling body 11 is provided with a through bore 19 defining at its outer end a recess generally designated 20 including an outer cylindrical portion 21, and an inner threaded portion 22 with a planar shoulder 23 extending radially between recess portions 21 and 22. A tubular resilient seal 24 is snugly received in recess portion 21 to be engaged by the distal end 25 of the connector 12 for sealingly connecting the connector to the coupling body in the made-up arrangement of the fitting. To effect such make-up, the coupling nut 13 is provided with an axially outer, radially inner threaded portion 26 engaging a radially outer threaded portion 27 on the connector. The nut may be further provided with an inturned, axially inner flange 28 abutting an inwardly facing annular shoulder 29 on the coupling body 11, as best seen in FIG. 3.

As best seen in FIG. 4, the valve operator 16 may comprise a one-piece element which may be formed as of molded synthetic resin. The valve operator includes an inner end 30, a retainer portion generally designated 31 outwardly of the inner end 30, and provided with a locking portion 32 arranged to frictionally, radially outwardly engage the inner surface of the tubular seal 24. At its outer end, the valve operator 16 defines a depressor portion 33 which projects axially outwardly from the retainer portion 31 to engage the operating element 15 of valve 14, as best seen in FIG. 3.

As shown in FIG. 4, the valve operator portions 30 and 31 may have a cruciform cross section. The depressor portion 33 may be cylindrical and is disposed coaxially of the cruciform portions 30 and 31.

Inner end 30 of the valve operator is provided with a radially outwardly projecting threaded means 34 arranged for threaded engagement with body thread 22. Locking portion 32 of the retainer portion 31 of valve operator 16 is defined by a plurality of angularly spaced rounded portions adapted to project radially into the seal 24, as best seen in FIG. 3, for locking the valve operator in adjusted position as a result of the adjusted threading of threaded portion 34 into the valve body thread 22. As the locking portion means 32 is spaced axially outwardly from the threaded portion 34, the locking portion not only serves as means for frictionally retaining the valve operator in adjusted position, but also serves to maintain axial parallelism of the valve operator with the axis of the coupling so as to maintain the depressor portion 33 in accurate alignment with the valve operator element 15 in making up the fitting.

As a result of the circumferentially discontinuous arrangement of the locking portion 32, the frictional retaining force between the locking portion and the tubular seal 24 is preselected to permit facilitated threaded adjustment of the valve operator in the coupling while yet providing a positive releasable locking of the valve operator in the adjusted position. In the illustrated embodiment, the seal 24 is formed of a suitable resilient material, such as rubber, and more specifically, may be formed of neoprene rubber, or the like, compatible with the fluid to be handled by the coupling. In the illustrated embodiment, the seal comprises a tubular neoprene rubber seal having a 90 durometer hardness.

In the illustrated embodiment, the cumulative axial extent of the valve operator portions 30 and 31 is greater than the axial extent of the seal 24 to provide the above discussed improved maintained axial parallelism of the valve operator relative to the axis of the coupling. The threaded portion 34 of the valve operator may have an axial extent substantially less than that of the threaded portion 22 of the coupling body. The axial extent of the locking portion 32 may be less than the axial extent of the seal 24.

The length of depressor portion 33 may be preselected to dispose the distal end 35 thereof selectively inwardly or outwardly of the distal end 36 of the seal 24 within the range of adjustment of the valve operator in the coupling. Thus, as shown in FIG. 2, the distal end of the depressor portion 33 may be disposed axially inwardly of the distal end 36 of the seal such as up to approximately three sixty-fourths inch, and as shown in FIG. 3, the distal end 35 of the depressor portion may be adjusted to be disposed outwardly of the seal end 36 approximately three sixty-fourths inch. Thus, illustratively, the axial adjustment of the valve operator may be at least approximately one tenth inch for improved control of the valve opening operation in the make-up of the coupling.

Adjustment of the valve operator in the valve body 11 may be effected by a suitable tool generally designated 37 having an end portion 38 adapted to engage the retainer portion of the valve operator between the angularly spaced locking portions 32 thereof. Thus, rotation of tool 37 with end portion 38 so engaged may be effected to selectively thread the valve operator inwardly or outwardly to the desired adjusted position suitable to effect desired opening of valve 14 by the engagement of the depressor portion surface 35 with the operating element 15 of the valve in the made-up arrangement of the fitting.

The construction of the fluid coupling 10 is extremely simple and economical. Adjustment of the position of the valve operator may be readily effected when desired while yet the valve operator is effectively positively retained in the adjusted position by the improved locking means cooperating with the improved positive threaded adjustment means as discussed above.

The foregoing disclosure of specific embodiments is illustrative of the broad inventive concepts comprehended by the invention.

I claim:

1. In a fluid coupling having a body defining an outer end portion, a through bore opening outwardly through said body outer end portion, a connector having a body defining an inner end portion, a bore opening inwardly through said connector inner end portion, a biased-closed valve in said bore at said connector inner end portion and having an operating element projecting inwardly for opening the valve as an incident of the outward depression of said operating element, and means for removably securing said connector to said coupling body, improved valve depressor means comprising:

means defining a stepped recess in the outer end of said body bore, said recess having an outer portion defining an inner radial shoulder, and a threaded inner portion extending inwardly from said shoulder;

a resilient tubular seal element coaxially in said recess abutting said shoulder; and a valve operator having an inner threaded end threaded to said body in said threaded inner portion of said body bore, a retainer portion outwardly of said threaded end having a locking portion frictionally radially outwardly engaging said seal element for selectively retaining said depressor in adjusted disposition in said recess, and a depressor portion extending outwardly from said retainer portion in adjusted, fixed disposition for depressing said valve as an incident of connection of said connector to said coupling body in sealing engagement with said seal.

2. The fluid coupling of claim 1 wherein said valve operator threaded end and retainer portion have a cumulative axial length substantially greater than that of said recess threaded inner portion.

3. The fluid coupling of claim 1 wherein said valve operator threaded end and retainer portion have a cumulative axial length substantially greater than that of said recess outer portion.

4. The fluid coupling of claim 1 wherein said valve operator threaded end and retainer portion have a cumulative axial length substantially greater than that of said seal.

5. The fluid coupling of claim 1 wherein said locking portion of the valve operator defines a radially outwardly rounded surface engaging said seal.

6. The fluid coupling of claim 1 wherein the circumferential extent of said locking portion is substantially less than that of said seal.

7. The fluid coupling of claim 1 wherein said locking portion defines a plurality of angular spaced, radially projecting surfaces engaging said seal.

8. The fluid coupling of claim 1 wherein said retainer portion is cruciform in cross section.

9. The fluid coupling of claim 1 wherein said threaded end of the valve operator is cruciform in cross section.

10. The fluid coupling of claim 1 wherein said locking portion of the valve operator is spaced substantially outwardly of said threaded end of the valve operator to maintain the valve operator axially parallel to the axis of said body bore.

11. The fluid coupling of claim 1 wherein said valve operator comprises a one-piece molded synthetic resin element.

12. The fluid coupling of claim 1 wherein said seal is formed of rubber.

13. The fluid coupling of claim 1 wherein said locking portion is constructed to provide a frictional retention force against said seal to effectively lock said valve operator in the adjusted position while permitting ready adjustment thereof by effecting threading of said valve operator threaded end in said threaded body recess portion.

14. The fluid coupling of claim 1 wherein the axial adjustability of said valve operator threaded end in said threaded body recess is at least approximately one-tenth inch.

* * * * *